Figure 1:
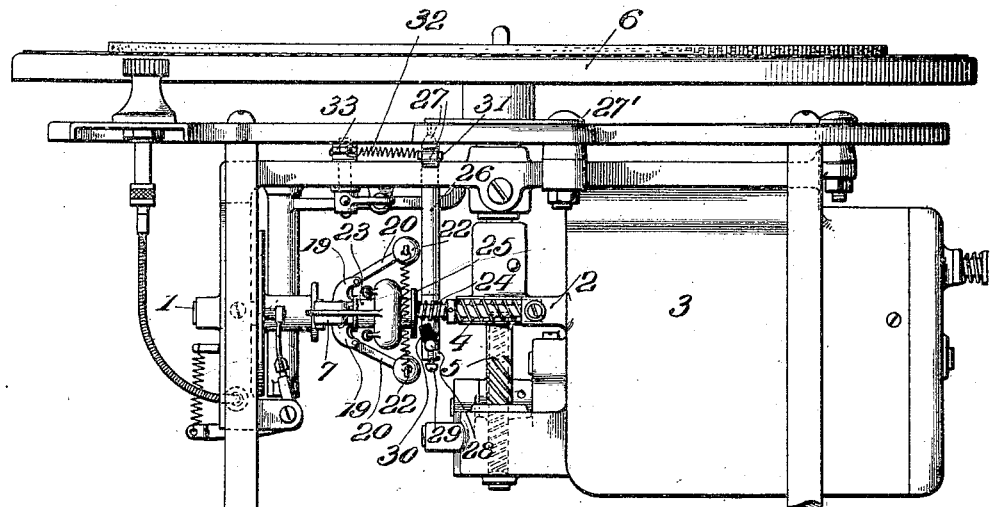

C. E. WOODS.
CALIBRATING DEVICE FOR SPEED INDICATORS FOR TALKING MACHINES.
APPLICATION FILED AUG. 30, 1913.

1,127,569.

Patented Feb. 9, 1915.

Witnesses
Jas. H. Anderson.
E. E. Warfield

Inventor
Clinton E. Woods,
By Mauro. Cameron. Lewis & Massie
Attorneys

UNITED STATES PATENT OFFICE.

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

CALIBRATING DEVICE FOR SPEED-INDICATORS FOR TALKING-MACHINES.

1,127,569.      Specification of Letters Patent.      Patented Feb. 9, 1915.

Application filed August 30, 1913. Serial No. 787,462.

*To all whom it may concern:*

Be it known that I, CLINTON E. WOODS, of Bridgeport, Connecticut, have invented a new and useful Improvement in Calibrating Devices for Speed-Indicators for Talking-Machines, which invention is fully set forth in the following specification.

The present invention relates to speed indicators for talking machines of the character set forth in my application Serial No. 770,717, filed May 29th, 1913, and has for its object to provide a simple, correct and effective means for calibrating the speed indicator, to the end that the indicating needle of the speed indicator shall correctly and accurately indicate on the scale the exact number of revolutions per minute imparted to the record supporting turn-table by the motor.

It is of the highest importance in the talking machine art that the operator should be able not only to adjust or control the speed of the motor, but that he should be advised by the speedometer as to the exact number of revolutions per minute imparted to the record, since it is highly desirable that the record in the act of reproduction should be driven at the same speed as was the record tablet when the sounds were originally recorded.

The object of the present invention, therefore, is to provide means whereby the speed indicator may be accurately calibrated, to the end that it may indicate with exact precision the speed at which the turn-table (and therefore the record) is being driven in the act of reproduction. In my said application Serial No. 770,717, I have disclosed a speedometer in which an indicating needle acting in coöperation with a suitable scale is moved by the action of a sliding element under the influence of centrifugal force, and the present invention has to do with the calibration of said sliding element with relation to the needle and the parts turning therewith, to the end that the needle acting in coöperation with the scale shall correctly indicate on the scale the number of revolutions imparted to the record by the motor.

Broadly stated, the invention consists in an indicating needle and a centrifugally operated device connected to the motor, and an adjustable part on one of these elements (preferably the needle or parts connected therewith) for accurately fixing the relation between the parts, to the end that when the motor is driving the record at a given number of revolutions per minute, the centrifugally operated device shall move the needle so that it will indicate on the scale the precise number of revolutions which the motor is imparting to the record. This is a delicate operation in the speedometer of my application Serial No. 770,717, and the present invention has particularly in view to facilitate such adjustment between the relation of the parts, to the end that the workman may quickly and readily effect the adjustment and at the same time procure an adjustment of great accuracy.

The inventive idea is capable of receiving a variety of mechanical expressions, one of which, for the purpose of illustrating the invention, is shown in the accompanying drawings, but it is to be expressly understood that such drawings are for the purpose of illustration only and not for the purpose of defining the limits of the invention, reference being had to the appended claims for this purpose.

Figure 2:
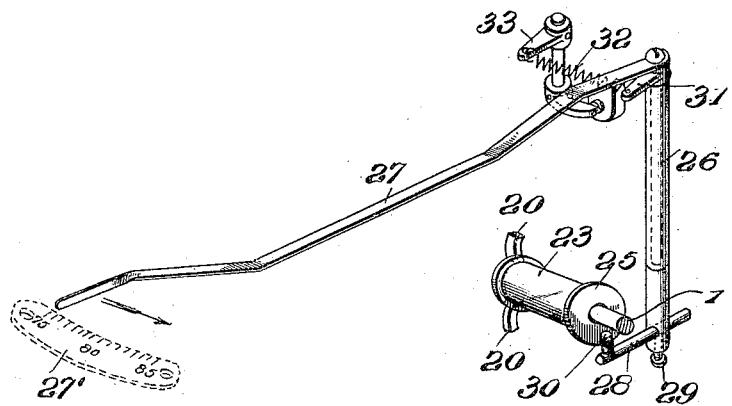

In said drawings:—Figure 1 is a side elevation of a talking machine with my invention applied thereto; Fig. 2 is a perspective view of the indicating needle and its mounting, together with the centrifugally actuated element for effecting the turning movement of the needle.

In said drawings, in which like reference numerals indicate like parts, 1 is the governor shaft integral with or operatively connected to the motor shaft 2 of a motor 3, said shaft 2 being provided with a worm 4 which transmits motion to the vertical shaft 5 on which is mounted the turn-table 6 which supports the sound record. On the hub 7 connected to the governor shaft are two radial bracket arms 19, in which are pivotally mounted two bell-crank levers 20—20, having two weights 22—22 at their outer ends and with their inturned ends engaging the flange end of a sleeve 23 slidably mounted on the governor shaft 1. Under the action of centrifugal force the inturned ends of the levers 20 slide the sleeve 23 along the shaft 1 against the tension of spring 24 reacting against such sleeve and a suitable abutment on the shaft. Adjoining said spring 24, the sleeve 23 is provided with an annular flange 25. On a vertical shaft 26 turning in suitable bearings in the frame of the machine is mounted a needle arm 27, whose end is adjacent to a scale 27'. Said shaft 26 is provided with a horizontally projecting arm 28 adjacent to or in the path of the flange 25 on the sleeve 23, when the latter is acted upon by centrifugal force to cause it to move along the shaft 1 and compress the spring 24. This arm 28 in the present invention is in the form of a pin turning in an opening passing through the shaft 26, the pin being fixedly secured in position by means of a set-screw 29. Mounted upon said pin 28 is a lug 30, the same constituting, in the present invention, the part which lies in the path of the flange 25 on the sleeve 23, and the particular and specific object of the present invention is to so adjust the relation between the part 30 on the pin 28 and the flange 25 on the sleeve 23 that at any given speed of the turn-table the needle 27 shall point to a corresponding speed on the scale. 31 is an arm secured to the shaft 26 and having a spring 32 connected thereto at one end, the other end being connected to an arm 33 secured to the frame of the machine, which spring acts normally to return the needle to the position which it occupies when the motor is at rest.

Since in talking machines of ordinary construction and operation, it is only desirable to indicate the operation of the parts for a small number of degrees above or below the desired operation, the scale usually employed onl‎ ‎cates a variation of about ten degrees, an‎ ‎this being the case it is unnecessary and therefore undesirable that the speed indicator should begin to operate below, say, seventy-five revolutions of the turn-table per minute. The number of revolutions now generally accepted as a standard is eighty revolutions per minute. Therefore, in the present instance I have shown a scale indicating from seventy-five to eighty-five revolutions of the turn-table per minute, and with such a scale it is only desirable that the speed indicating needle should begin to move or operate when the turn-table has reached a speed of seventy-five revolutions per minute. For this reason the pin 28 passing through the shaft 31 is turned so as to bring the lug 30 into a position where it will be contacted by the flange 25 on the sleeve 23, when the turn-table is moving at seventy-five revolutions per minute. The motor is then speeded up to say eighty revolutions per minute, and it is noted whether or not the indicating needle 27 points to the figure 80 on the scale. It may point above or below such figure. If it points above, it is because the shaft 26 and with it the needle 27 has been turned through too great an angle, and this is due to the fact that the pin 28 has been turned through too great an angle.

This can be obviated by loosening the set-screw 29 and increasing the distance between the lug 30 and the shaft 26 by pulling out the pin 28 and again setting the set-screw at the point where the needle will indicate or point to the figure 80 when the turn-table is moving at 80. Likewise, if the needle points below 80 when the turn-table is moving at eighty revolutions, it is because the needle, the shaft, and the pin 28 have not moved through a sufficient angle, and, therefore, the angle should be increased, and this is accomplished by loosening the set-screw 29 and pushing the pin 28 farther in, so as to bring the lug 30 nearer to the shaft 26.

What is claimed is:—

1. In a speed indicator for talking machines, the combination of a motor-driven centrifugally-actuated element with a speed-indicating needle actuated by said element, and means adjustable in two planes with respect to said element for calibrating the operative relation between said element and said needle.

2. In a speed indicating mechanism for talking machines, the combination of a motor-driven centrifugally-actuated element and an indicating needle mounted on a revoluble shaft, a pin projecting radially from said shaft and bearing a part in operative relation with said centrifugally-actuated element, said pin being adjustable radially of said shaft.

3. In a speed indicator for talking machines, the combination of a motor-driven centrifugally-operated element, an indicating needle mounted for angular movement and having a part connected thereto in the path of said centrifugally-operated element, and means adjustable in two planes with respect to said element for calibrating the relation between said needle and said last-named element.

4. In a speed indicator for talking machines, the combination of a motor-driven centrifugally-operated element with a speed-indicating needle mounted on a vertical shaft, and a contact arm projecting radially from said shaft and having a part in the path of said centrifugally-operated element and capable of adjustment radially to said shaft and in a vertical plane parallel with said shaft.

5. In a speed governor for talking machines, the combination of a motor-driven centrifugally-operated element with an indicating needle mounted to turn about a given axis, and a contact lug or part moving with said needle about its axis, said contact part or lug being capable of adjustment in a plane parallel with said needle and also in a plane vertical to or normal to the line of movement of said needle.

6. In a speedometer for talking machines, the combination of a speed-indicating needle, a revoluble vertical shaft to which said needle is keyed, a contact lug, a pin supporting said lug and connected to turn with said needle, said pin being capable of adjustment in a line radial to said shaft and also of turning around its own axis, means fixing the pin in any adjusted position, and a motor-driven centrifugally-operated device in operative relation with said contact lug.

7. In a speedometer for talking machines, the combination of a motor-driven shaft, a sleeve mounted to slide on but revolve with said shaft, a centrifugal device for imparting sliding movement to said sleeve, a speed-indicating needle revoluble around an axial point, a pin connected to said needle and mounted to turn therewith, said pin being capable of adjustment in a line radial to the axis of the needle and also capable of being turned around its own longitudinal axis, means securing said pin in its adjusted position, and a contact lug carried by said pin in the path of said sleeve when the parts are in operation.

In testimony whereof I have signed this specification in the presence of two subscribing witnesses.

CLINTON E. WOODS.

Witnesses:
JOHN R. PETRIE,
JOHN S. GRIFFITH.